March 31, 1964 D. D. LAING 3,126,625
METHOD OF JOINING AND BONDING TOGETHER
SIMILAR OR DISSIMILAR METALS
Filed May 15, 1961 2 Sheets-Sheet 1
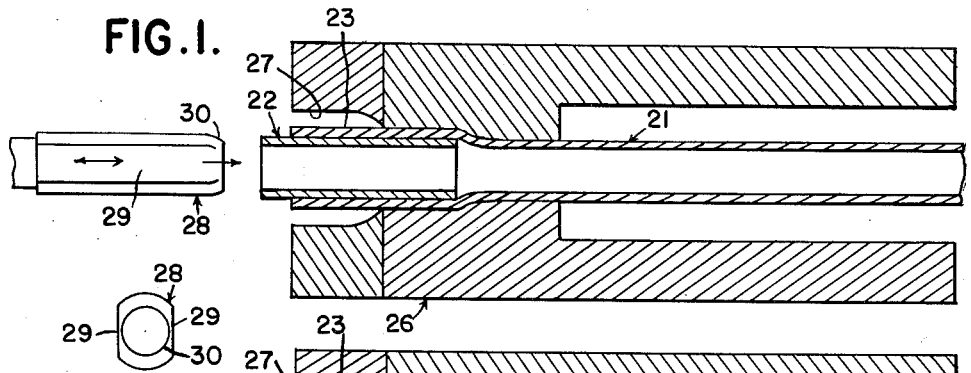
FIG. 1.
FIG. 3.
FIG. 2.
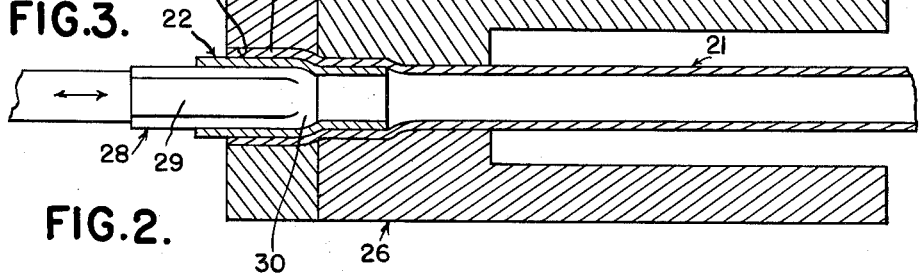
FIG. 4.
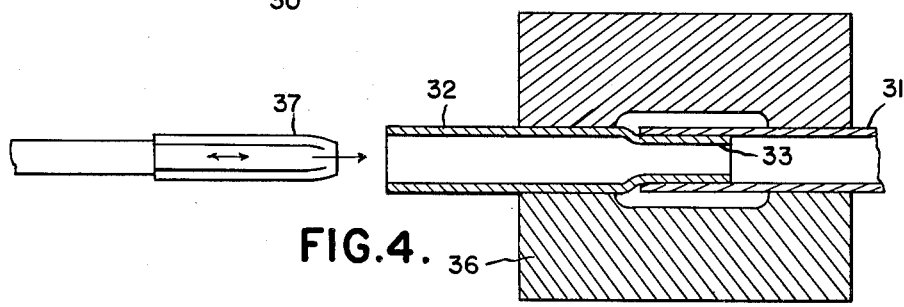
FIG. 5.
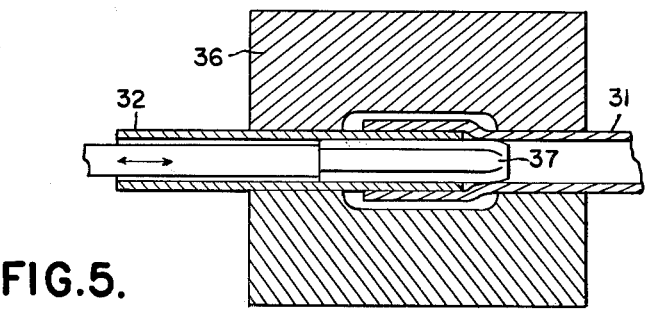
INVENTOR.
DAVID D. LAING
BY Whittemore
Hulbert & Belknap
ATTORNEYS March 31, 1964  D. D. LAING  3,126,625
METHOD OF JOINING AND BONDING TOGETHER
SIMILAR OR DISSIMILAR METALS
Filed May 15, 1961  2 Sheets-Sheet 2

INVENTOR.
DAVID D. LAING
BY Whittemore,
Hulbert & Belknap
ATTORNEYS

United States Patent Office 3,126,625
Patented Mar. 31, 1964

3,126,625
METHOD OF JOINING AND BONDING TOGETHER SIMILAR OR DISSIMILAR METALS
David D. Laing, Detroit, Mich., assignor to Calumet & Hecla, Inc., Allen Park, Mich., a corporation of Michigan
Filed May 15, 1961, Ser. No. 110,225
5 Claims. (Cl. 29—470.3)

The present invention relates to a method of joining and bonding together the ends of tubes of similar or dissimilar metals.

The present application is a continuation-in-part of my prior copending application Serial No. 755,697, filed August 18, 1958, and now abandoned.

It is an object of the present invention to provide a method for forming a metallurgical bond or weld between overlapped end portions of metal tubes. The term "metallurgical bond" is intended to include welding and is characterized by a matrix formed of an intimate mixture of two different metals of the tubes at the joint therebetween.

Specifically, it is an object of the present invention to provide a method of bonding overlapped end portions of metal tubes which comprises placing the end portions of the tubes in overlapped relation, providing relative rotation between a tool and one of the radially exposed surfaces of one of the tubes at the over-lapped end portions thereof, and applying pressure between the tool and overlapped tube end portions of metal deforming intensity so as to cause radial deformation or displacement of the overlapped end portions of both of said tubes while generating heat by friction, the surface of the overlapped end portions of the tubes opposite to that surface in frictional contact with the tool being free to provide for radial deformation thereof and to eliminate cooling of the metal of the tube joint by conduction of heat.

More specifically, it is an object of the present invention to provide a method for producing tube joints of tubes of dissimilar metal which comprises supporting overlapped end portions of the tubes against rotation, inserting a rotating mandrel within the inner tube end portion, applying a radial outward force of metal deforming intensity to the inner surface of the inner tube, rotating the tool in pressure contact with the inner surface of the inner tube to generate heat to heat the metal of the overlapped end portions of the tubes to bonding temperature, and maintaining the outer surface of the outer tube at the overlapped end portions of the tubes free for radial outward deformation.

It is a further object of the present invention to produce a bonded joint between end portions of tubes of dissimilar metal which comprises supporting overlapped end portions of the tube against rotation, applying a hollow tool in frictional and pressure contact with the outer surface of the end portion of the outer tube, rotating the tool to generate heat, and applying a radially inward pressure of metal deforming intensity to the overlapped end portions of the tubes, and maintaining the inner surface of the overlapped end portion of the inner tube free for radially inward deformation.

It is a further object of the present invention to provide a method as defined in the two preceding paragraphs in which the dissimilar metals of the tubes are copper and aluminum, and in which the tool is applied to the copper tubing.

It is a further object of the present invention to provide a method for producing a metallurgical bond between overlapped end portions of tubing of different metals which comprises supportnig the tubing with overlapped end portions against rotation, providing a rotary tool having tapered tube engaging surfaces of circular cross-section dimensioned to produce radial deformation of the overlapped tube end portions when advanced axially thereof in coaxial relationship thereto, rotating said tool at a substantial speed to generate sufficient heat by friction to raise the metal of the overlapped end portions of the tubes to bonding temperature, and advancing the tool axially of the overlapped end portions of the tubes to produce radial deformation thereof so as to develop bonding pressure at the temperature produced by friction between the tool and tube end portions.

Other objects and features of the invention will become apparent as the description proceeds, especially when taken in conjunction with the accompanying drawings, illustrating preferred embodiments of the invention, wherein:

FIGURE 1 is a sectioned view showing an expanded clamped tube member overlapping a second tube member with an internal tool about to enter the second member.

FIGURE 2 is a view similar to FIGURE 1 showing the tool after it has entered the second or interior tube.

FIGURE 3 is an end view of the tool showing its opposed flat sides.

FIGURE 4 is a sectioned view of a second embodiment wherein the end of the second member is reduced to fit inside the first member with the tool shown in a position before it enters the interior of the second member.

FIGURE 5 is a view similar to FIGURE 4 wherein the tool has moved axially into the overlapped tube joint.

Figure 6:
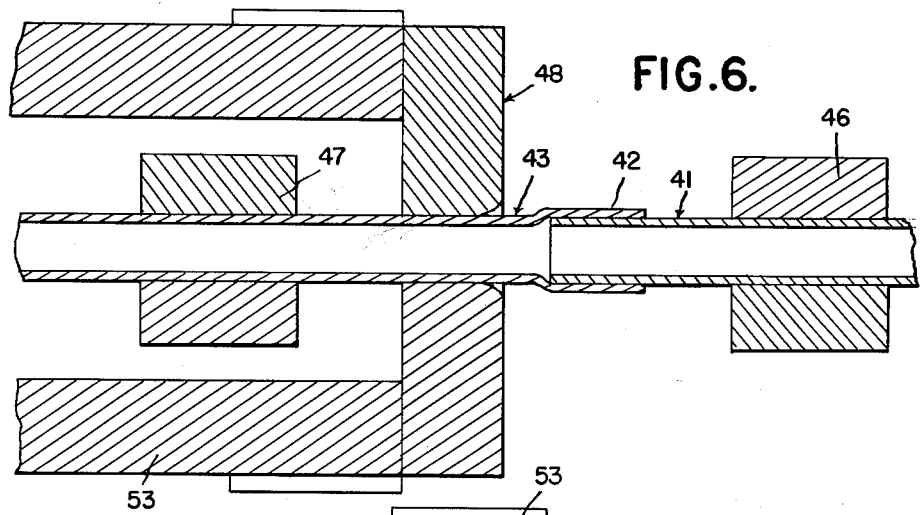
FIGURE 6 is a still further embodiment showing a second tubular member having an expanded end fitted over a first tubular member with each of the tubular members clamped and with a rotatable die about to move the telescoped joint of the two tubular members.

Referring now to the drawings, FIGURES 1-3 show the operation of providing a tube end joint between a first tube 21 and a second tube 22. The tube 22 is illustrated as relatively short and may be used for connecting the combination of tubes 21, 22 to a third tube formed of the same metal as the short tube 22.

In producing the metallurgically bonded joint between the tubes 21 and 22, an end portion 23 of the tube 21 is expanded so that it receives a portion of the tube 22 in telescoped or overlapped relation. A clamp 26 is provided having a clamping surface conforming with the expanded end 23 of the tube 21 and a flared cavity portion 27. It will be observed that the clamp 26 engages a portion of the overlapped ends of the tubes and the arrangement is such that pressure applied thereto will prevent rotation of the short tube 22 during the operation.

A rotating tool 28 is provided having a generally cylindrical head formed with flats 29 on opposite sides thereof and having a tapered end 30 for entering the inner tube 22. The tool, while rotating rapidly, is moved axially into the tube 22 to the position shown in FIGURE 2, expanding both tubes 21 and 22, and exerting sufficient pressure and causing sufficient frictional heat to be developed to produce a metallurgical bond or weld between the contacting surfaces of the tubes 21 and 22. The tool 28 is then withdrawn and the bonded tubes 21 and 22 removed from the clamp 26. It will be apparent of course, that under proper circumstances the clamp 26 together with the tubes 21 and 22 may be rotated in addition to or instead of the tool 28 as desired.

It will be observed that the flared portion 27 of the clamp 26 leaves the outer surface of the tube end free for radial outward deformation and also prevents conduction of heat away from the overlapped tube end portions which are to be united in the bonded joint. This is a very important feature of the present invention, since it permits the end portions of the tubes to be brought to bonding temperature solely by heat generated from controlled friction between the tool 29 and the tube joint surface in contact therewith. This is possible only because the heat generated by friction is conducted away from the tube joint solely through the metal of the tubes and no heat loss by conduction occurs due to engagement between the tube surface opposite to the surface in contact with the tool.

Also, the degree and rate of heating can be accurately controlled by the relative speed of rotation between the tool and tube joint, the shape of the tool, the relative dimensions of parts, or the radial deformation of the tube joint and the rate of relative axial movement between the tool and tube joint.

During radial outward displacement of the tube ends a pressure is developed between the tube ends and tool, and between the tube ends themselves, which is determined by the dimensions, physical properties and instantaneous temperature of the tube ends.

In FIGURE 2 the tube joint is shown as expanded to fill the cavity 27, but it is to be understood that this merely shapes the final joint and that bonding by heat and pressure will be completed or substantially completed before the outer surface of the tube end portion 23 engages the flared surface 27. It is of course recognized that conduction of heat to the die will cool the material of the joint as soon as good contact is established with the flared surface 27.

Very satisfactory results have been obtained when the tube 21 is formed of aluminum and the short tube 22 is copper. In general, it may be said that best results are obtained when the deforming pressure and heat generating friction are applied to the copper tube when the dissimilar metals of the two tubes are aluminum and copper. In the particular example illustrated in FIGURES 1–3, the copper and aluminum tubes 21 and 22 had an initial outside diameter of .375", a wall thickness of .050", and of course an inside diameter of .275". Prior to telescoping the tubes 21 and 22 to have their end portions overlapped as shown in FIGURE 1, the end portion 23 of the aluminum tube 21 was expanded so that its inside diameter was as nearly as possible equal to the outside diameter of the tube 22 but dimensioned to permit ready insertion of the tube 22 into the expanded end portion 23 of the tube 21. The pressure applied by the die 26 must be such as to effectively grip the short tube 22 within the enlarged tube end portion 23.

The tool 28 is of a carbide composition and its cylindrical portion has an outside diameter of .328". With this arrangement it will be appreciated that radial deformation of the inner surface of the tube 22 is nominally .078". In practice, it is found that radial deformation of this amount is satisfactory to produce the required metallurgical bond although a radial deformation on the order of .050" is normally sufficient.

In the particular operation the tool 28 was rotated at speeds between 2000 and 2500 r.p.m. and was advanced axially so that its total travel from initial contact with the end of the tube 22 to the position shown in FIGURE 2, was completed in approximately 1½ seconds.

It will of course be apparent that the rate of rotation of the tool, the rate of its axial advance, the wall thickness of the tubes 21 and 22, the material of the tubes 21 and 22, and the diameter of the cylindrical portion of the tool 28 all affect the temperature and pressure attained during the operation. Accordingly, the operation is very flexible and for a particular run of tubing, adjustments as to relative temperatures and pressures may be accurately controlled.

If desired, the contacting surfaces between the tubes 21 and 22 may be knurled or otherwise treated before insertion of the tube 22 into the tube end 23 to provide a mechanical gripping in addition to the metallurgical bond. This also facilitates gripping of the short tube 22 by the inner surface of the tube end 23 by forces transmitted from the clamp 26.

The method as above described includes the expansion of the tube end 23 to an inside diameter which may be nominally equal to, slightly less, or very slightly greater, than the outside diameter of the tube 22, cleaning, as with an emery material, the contacting surfaces of the tubes 21 and 22, clamping the tube 21 in the clamp 26 and thereby clamping the short tube 22 in the position illustrated, and finally, inserting the tool 28 while rotating at substantial speeds into the tube 22 to produce radial deformation of the overlapped tube ends with the generation of sufficient heat to bring the overlapped tube end portions to welding or metallurgical bonding temperature under the pressure as developed by resistance to radial deformation of the overlapped tube ends.

The rotational speed of the tool 28 which is sufficient to generate bonding temperature will be dependent on the pressure between the bonded surfaces, the thickness and material of the bonded members, the coefficient and friction between the tool and the adjacent tube, and the axial rate of insertion of the tool into the tube.

FIGURES 4 and 5 show a further manner of clamping and forming the tubes 31 and 32 to produce the bonded joint. In this embodiment of the invention the end 33 of the tube 32 is reduced in diameter and is inserted into the end of the tube 31 and both tubes are directly held by a clamp 36. The tool 37 which is similar in cross-section to the tool 28, has an outside diameter corresponding to and somewhat larger than the inside diameter of the compressed portion 33 of the tube 32. The tool is rotated at substantial speed, as for example 2000 to 2500 r.p.m., and is advanced into the overlapped tubes, expanding the reduced tube portion 33 radially outwardly to the condition illustrated in FIGURE 5. It will be noted in this case that the cavity within the clamp 36 is sufficiently enlarged so that the radial expansion of the tube joint does not bring about contact between the clamp and the outer surface of the tube joint. This of course eliminates heat loss by conduction to the clamp as has previously been described.

Figure 7:
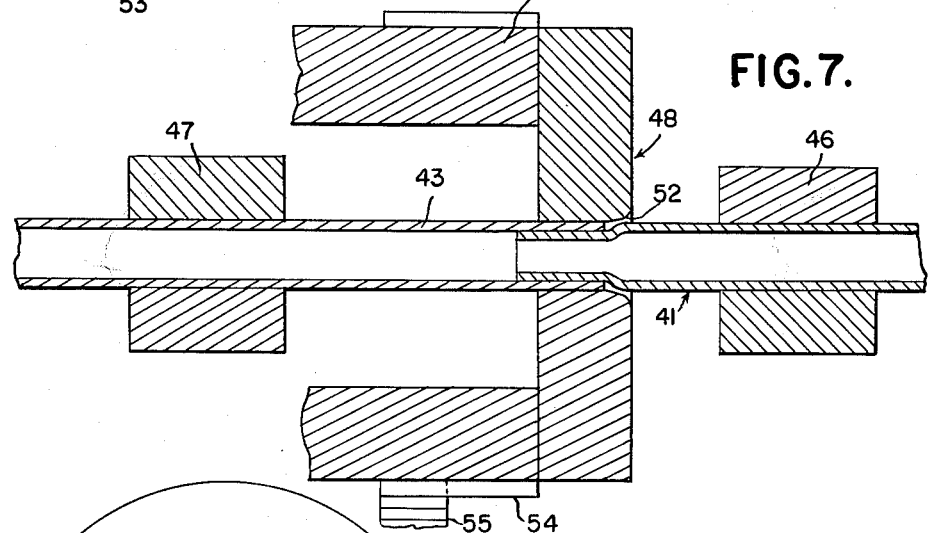
FIGURE 7 is a view similar ot FIGURE 6 wherein the die has moved over the telescoped joint of the tubular members.
Figure 8:
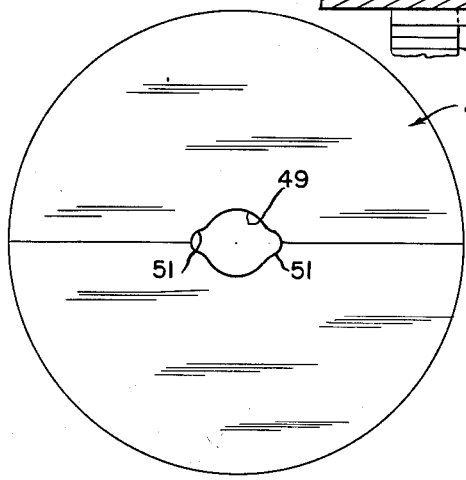
FIGURE 8 is an end view of the rotating die showing opposed cutouts along a diameter of the die opening.

Referring now to FIGURES 7–9, there is illustrated yet another embodiment of the present invention. In this embodiment, after the tubes have been telescoped with their end portions in overlapped relation, an external die is rotated about the overlapped tube portions to provide the bonding pressure and heat. In this embodiment an internal rotating member is not employed and therefore the ends of tubes of any length may be bonded directly together and are not limited by the length of an inserted tool.

In FIGURE 7 the tube 41 is shown as having its end portion inserted in the enlarged end portion 42 of a tube 43, the tube 41 and 43 being separately held by clamps 46 and 47 respectively. A split tool 48 having a generally cylindrical opening 49 formed centrally therein provided. The generally cylindrical opening 49 is provided with diametrically opposite lateral extensions 51 which serve the same purpose as the flats on the internal tools 28 and 37, and prevent metal pick up during rotation of the tool against the adjacent surface of the tube joint. The forward edges of the opening 49 are tapered as indicated at 52 to serve the same function as the tapered end portion 30 of the tool 28. The tool 48 is supported adjacent its periphery by a cylinder 53 which is rotated by suitable means such for example as a tooth portion 54 in mesh with a driving gear 55.

In general, the operation is characterized by overlapping tube end portions, deforming the overlapped end portions radially inwardly or outwardly by relative rotation with respect to a tool having a surface portion of a different diameter from the diameter of the surface portion of the tube joint which it is to contact, generating sufficient heat by friction during radial deformation of the tube joint by the tool to bring the material of the tubes to metallurgical bonding temperature at the pressure developed, as a result of radial deformation of the overlapped tube end portions. This is accomplished by an operation in which welding temperature is achieved due to the fact that the surface of the tube joint opposite to that surface thereof in frictional engagement with the tool is left free for radial deformation and which hence, eliminates heat loss from the metal of the tubes at the joint by conduction.

The operation has proven particularly satisfactory in solving the difficult problem of producing a satisfactory joint between copper and aluminum tubes. Best results have been obtained when the heat generation and deforming pressure takes place at the exposed surface of the copper tube. The metallurgical bond between the overlapped end portions of the tubes is characterized by the presence of a definite matrix in which the different metals of the tubes are intermingled.

While the disclosure herein illustrates the metallurgical bonding of end portions of tubes, it will of course be appreciated that either of the tubes may in fact be a tubular portion of a body such for example as a container, an accumulator, or the like.

It will be observed that in all modifications of the present invention end portions of tubes overlap and a weld is produced between the overlapped end portions of the tubes. However, it is not necessary for the weld to be coextensive with the overlapped end portions. For example, in FIGURE 1 the weld zone is limited to that portion of the overlapped end portions received within the cavity 27.

In all embodiments of the invention except that of FIGURES 1–3, the surface of the tube remote from the surface to which the rotational frictional pressure is applied remains free and unsupported throughout the entire welding operation and thereafter. In the method which is illustrated in FIGURES 1–3 it will be understood that the welding of the two tubes has been completed when the outer surface of the outer tube contacts the surface of the cavity 27.

The drawings and the foregoing specification constitute a description of the improved method of joining and bonding together similar or dissimilar metals in such full, clear, concise and exact terms as to enable any person skilled in the art to practice the invention, the scope of which is indicated by the appended claims.

What I claim as my invention is:

1. The method of forming a weld joint between two metal tubes which comprises inserting an end portion of one tube within an end portion of the other tube to provide an overlapped weld zone thereof, supporting both of said tubes against rotation at points adjacent but spaced longitudinally from said weld zone to provide an inner exposed surface of the inner tube and an outer exposed surface of the outer tube within said weld zone, rotating a tube expanding tool within the inner tube portion in said weld zone to provide radially outward pressure to expand the portion of the inner tube radially outward to establish welding pressure between the inner surface of the outer tube and the outer surface of the inner tube, controlling the rate and duration of the rotation of said tool to bring the engaged tube surfaces within the weld zone by friction to welding temperature at the applied pressure, and maintaining the outer surface of the outer tube portion within the weld zone free and unsupported until the weld is established.

2. The method of forming a weld joint between two metal tubes of the same diameter which comprises reducing an end portion of one tube, inserting the reduced end portion within an end portion of the other tube to provide an overlapped weld zone thereof, supporting both of said tubes against rotation at points adjacent but spaced longitudinally from said weld zone to provide an inner exposed surface of the inner tube and an outer exposed surface of the outer tube within said weld zone, rotating a tube expanding tool within the inner tube portion in said weld zone to provide radially outwardly pressure to expand the portion of the inner tube radially outward to establish welding pressure between the inner surface of the outer tube and the outer surface of the inner tube, continuing the application of radial outward pressure to expand both overlapped tube end portions in the weld zone until the inside diameter of the initially reduced tube end portion is restored substantially to the same inner diameter as both of said tubes, controlling the rate and duration of the rotation of said tool to bring the engaged tube surfaces within the weld zone by friction to welding temperature at the applied pressure, and maintaining the outer surface of the outer tube portion within the weld zone free and unsupported until the weld is established.

3. The method of forming a weld joint between two metal tubes which comprises inserting an end portion of one tube within an end portion of the other tube to provide an overlapped weld zone thereof, supporting both of said tubes against rotation at points adjacent but spaced longitudinally from said weld zone to provide an inner exposed surface of the inner tube and an outer exposed surface of the outer tube within said weld zone, providing a tube expanding mandrel having a tapered end and an elongated body of a diameter greater than the internal diameter of the inner tube portion within the weld zone, advancing the mandrel axially into the portion of the inner tube within the weld zone and rotating the mandrel to expand the portion of the inner tube radially outward to establish welding pressure between the inner surface of the outer tube and the outer surface of the inner tube, controlling the rate and duration of the rotation of said mandrel to bring the engaged tube surfaces within the weld zone by friction to welding temperature at the applied pressure, and maintaining the outer surface of the outer tube portion within the weld zone free and unsupported until the weld is established.

4. The method of forming a weld joint between two metal tubes which comprises inserting an end portion of one tube within an end portion of the other tube to provide an overlapped weld zone thereof, supporting both of said tubes against rotation at points adjacent but spaced longitudinally from said weld zone to provide an inner exposed surface of the inner tube and an outer exposed surface of the outer tube within said weld zone, rotating a tube reducing tool having a tube reducing surface engaging the outer surface of the outer tube portion in the weld zone to provide radial inward pressure to reduce the outer tube end portion in the weld zone to establish welding pressure between the inner surface of the outer tube and the outer surface of the inner tube, controlling the rate and duration of the rotation of said tool to bring the engaged tube surfaces within the weld zone by friction to welding temperature at the applied pressure, and maintaining the inner surface of the inner tube portion within the weld zone free and unsupported until the weld is established.

5. The method of forming a weld joint between two metal tubes which comprises inserting an end portion of one tube within an end portion of the other tube to provide an overlapped weld zone thereof, supporting both of said tubes against rotation at points adjacent but spaced longitudinally from said weld zone to provide an inner exposed surface of the inner tube and an outer exposed surface of the outer tube within said weld zone, providing a tube reducing tool having an elongated opening flared at one end and having a portion of smaller diameter than the outside diameter of the outer tube portion within the weld zone, advancing the tool axially to position its elongated opening in the weld zone and rotating the tool to provide radial inward pressure to reduce the outer tube portion in the weld zone to establish welding pressure between the inner surface of the outer tube and the outer surface of the inner tube, controlling the rate and duration of the rotation of said tool to bring the engaged tube surfaces within the weld zone by friction to welding temperature, and maintaining the inner surface of the inner tube portion within the weld zone free and unsupported until the weld is established.

References Cited in the file of this patent

UNITED STATES PATENTS

| | | |
|---|---|---|
| 2,795,039 | Hutchins | June 11, 1957 |

FOREIGN PATENTS

| | | |
|---|---|---|
| 973,983 | France | Feb. 16, 1951 |
| 427,912 | Great Britain | May 2, 1935 |
| 572,789 | Great Britain | Oct. 24, 1945 |